Nov. 23, 1948.  A. B. PICKETT  2,454,292
REVETMENT MAT
Filed April 5, 1946  4 Sheets-Sheet 1
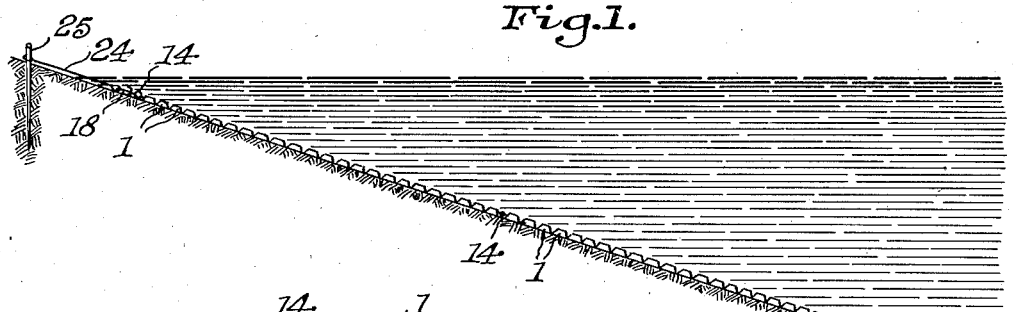
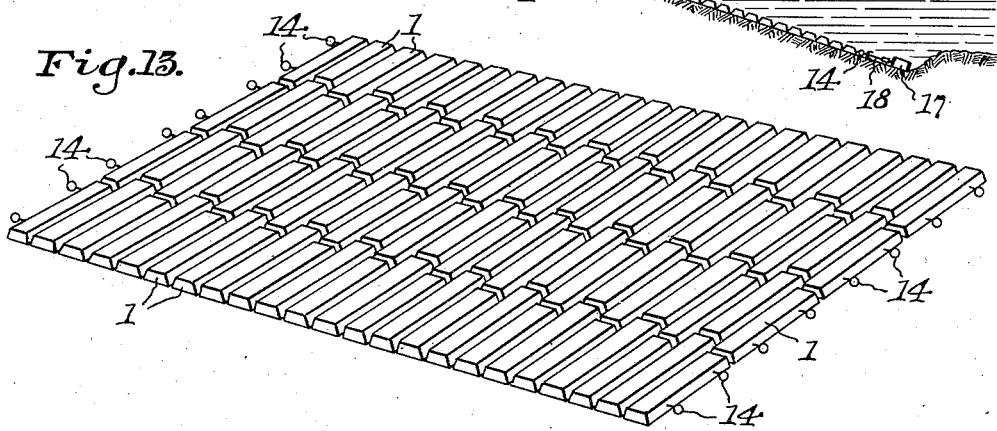
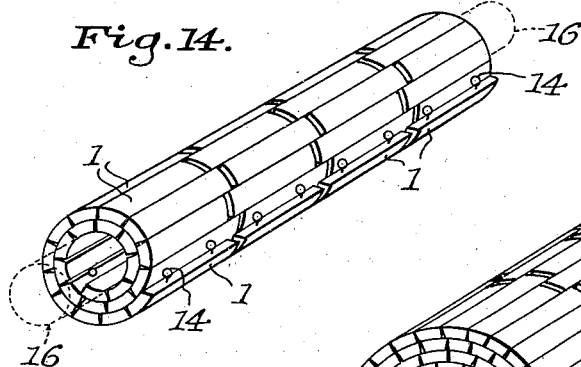
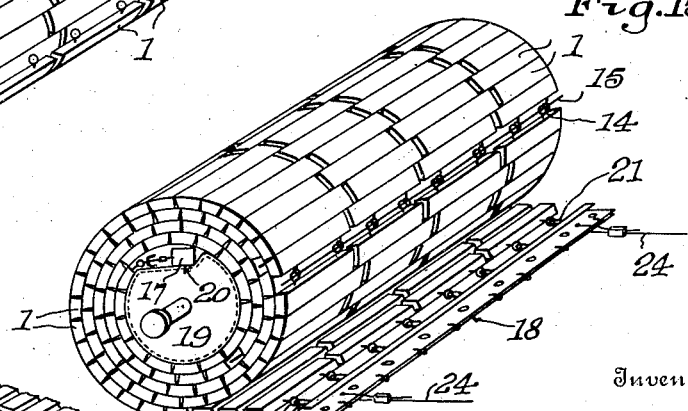
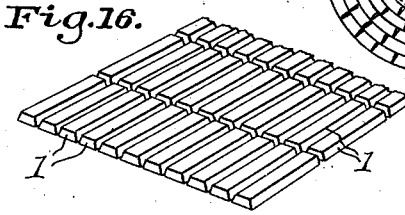
Inventor
Andrew B. Pickett

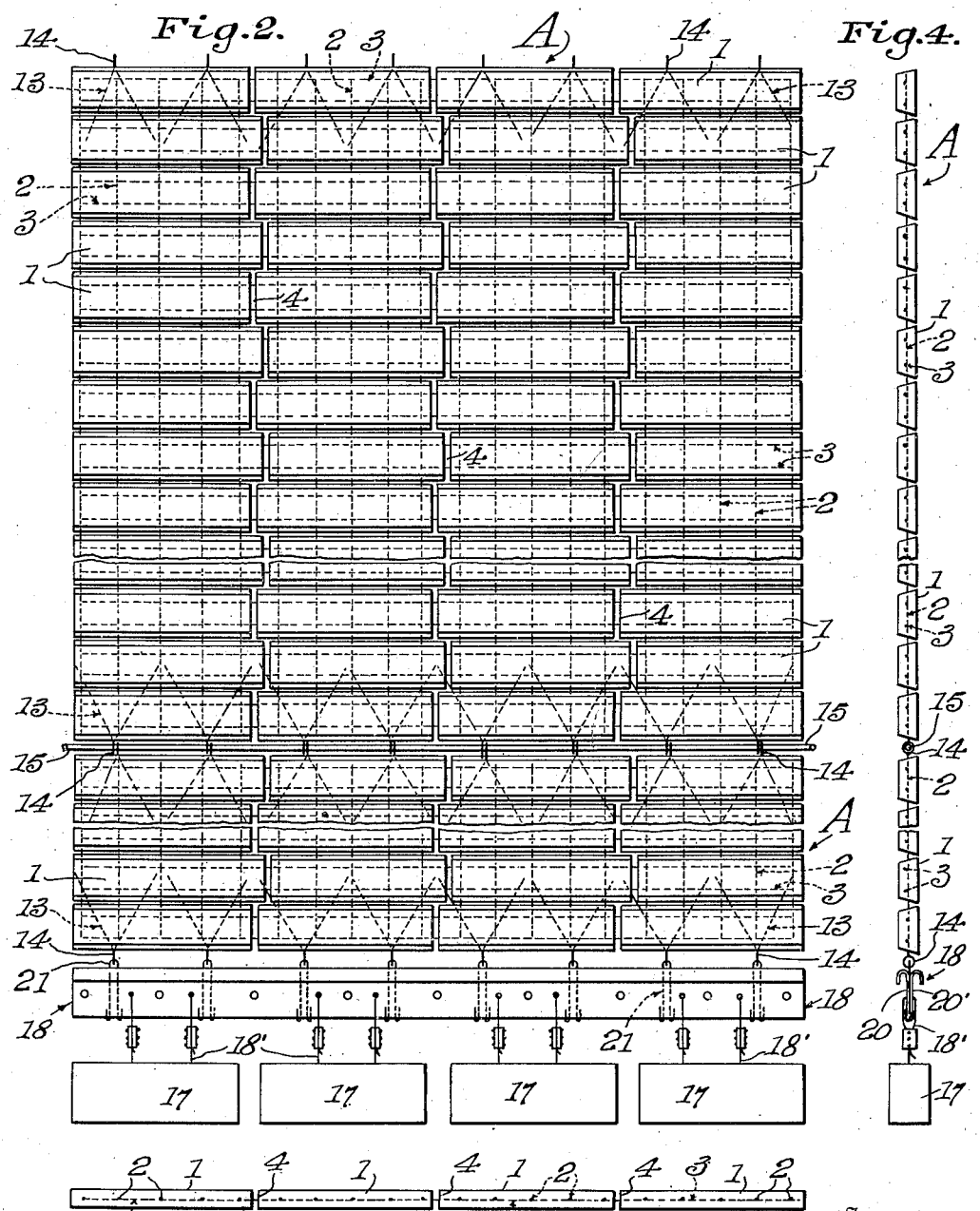

Nov. 23, 1948.　　　A. B. PICKETT　　　2,454,292
REVETMENT MAT
Filed April 5, 1946　　　　　　　　　　　　4 Sheets-Sheet 3
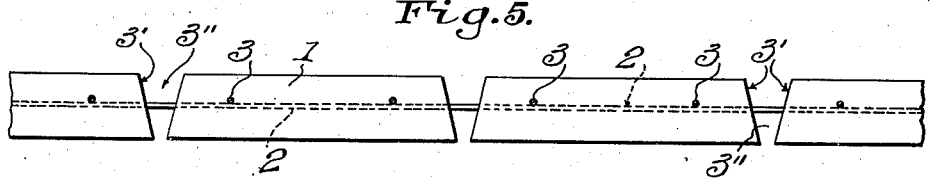
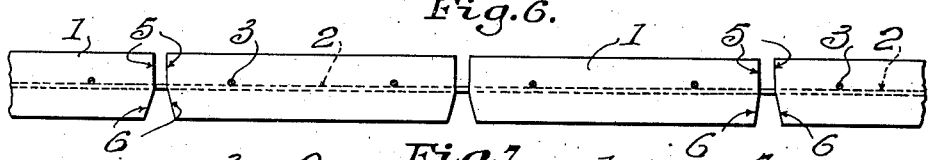
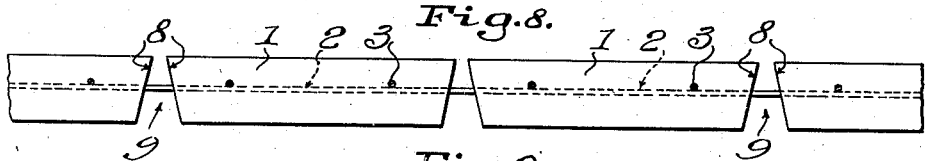
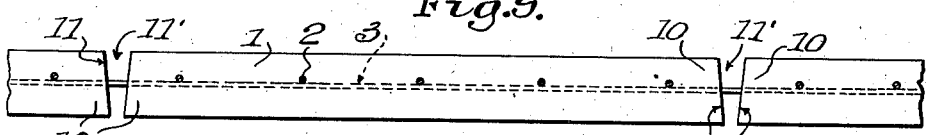
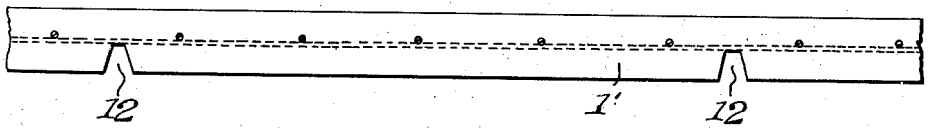
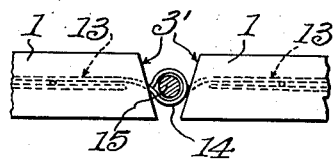
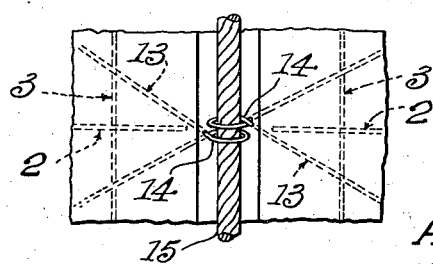
Inventor
Andrew B. Pickett
Attorneys Nov. 23, 1948.　　　A. B. PICKETT　　　2,454,292
REVETMENT MAT Filed April 5, 1946　　　　　　　　　　　　4 Sheets-Sheet 4

Inventor
Andrew B. Pickett
By Francis T. Vanderwerker and
Joseph U. Crowe
Attorneys Patented Nov. 23, 1948

2,454,292

UNITED STATES PATENT OFFICE 2,454,292

REVETMENT MAT

Andrew B. Pickett, United States Army

Application April 5, 1946, Serial No. 659,743

3 Claims. (Cl. 61—37)

(Granted under the act of March 3, 1883, as amended April 30, 1928; 370 O. G. 757)

The invention described herein may be manufactured and used by or for the Government for governmental purposes, without payment to me of any royalty thereon.

This invention relates to revetment mats for use in protecting river banks, river bottoms, shores, canals, etc., thereby protecting the covered area against erosion, wave wash and other similar destructive elements.

One of the objects of the invention is to provide an improved revetment mat composed of closely spaced reinforced blocks, constructed and flexibly held together in such a manner as to permit the block to be coiled up into a roll, taken to the place of use and then unrolled over an area on a subaqueous river bank or the like for protecting the same against erosion.

Another object of the invention is to provide a roll-type flexible revetment mat including a plurality of flexible unit sections, with each unit section having projecting loops at each end, said loops being formed either of projecting wires or separate inserted wires and connected together by means of a wire strand, cable or rod threaded through the projecting loops.

Briefly stated, the improved roll-type flexible revetment mat comprises a plurality of flexible unit sections constructed of a plurality of reinforced concrete blocks closely spaced apart and held together by reinforcing wires which extend continuously from block to block both horizontally and transversely whereby a flexible unit section is produced enabling the section to be coiled up into a roll with or without a center core. The transverse spaces or joints between the blocks and the spaces between the ends of the blocks permit considerable bending or flexure of the mat in both directions, thus enabling the mat to conform to the irregularities of the underwater area and insuring complete coverage thereof.

The rolled-up flexible revetment mats are taken to the place of use and are unrolled down the slope of a river bank for protecting the same against erosion.

With the above and other objects and advantages in view, the invention consists of certain features of construction and operation of parts which will hereinafter be described and illustrated in the accompanying drawings in which:

Figure 1 is a vertical sectional view through an enbankment protected by the improved roll-type flexible revetment mat;

Figure 2 is an enlarged fragmentary plan view of one complete unit section of the revetment mat and a portion of an adjacent unit section connected thereto at one end by means of a wire strand extending through wire loops;

Figure 3 is a transverse edge view of a unit section;

Figure 4 is an end elevation thereof;

Figure 17:
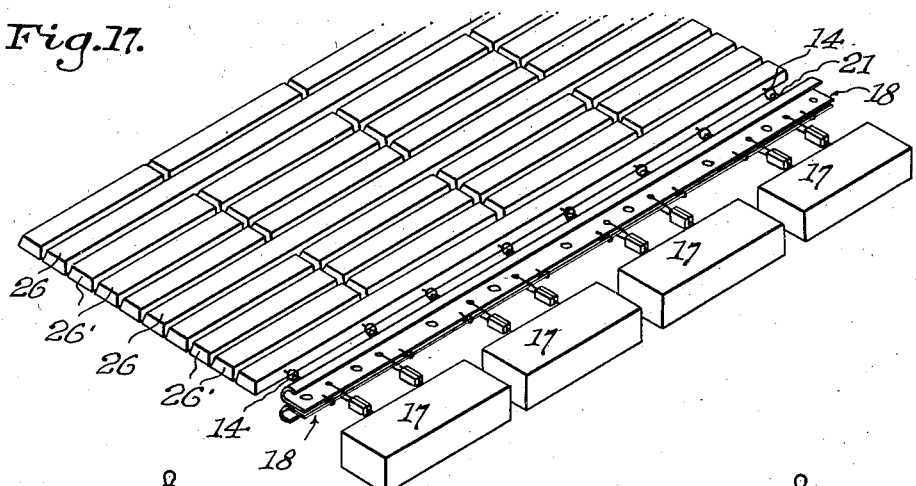
Figure 18:
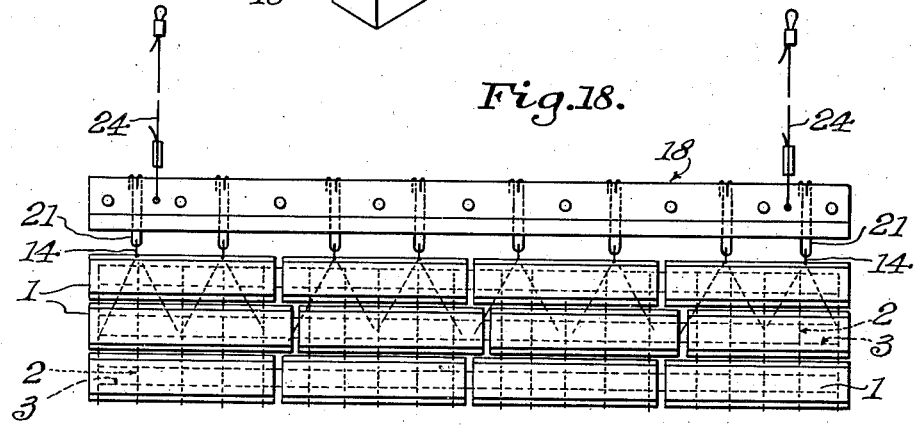
Figure 19:
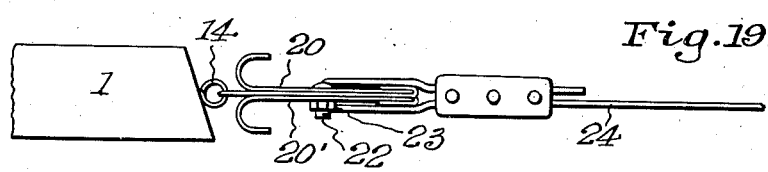
Figure 20:
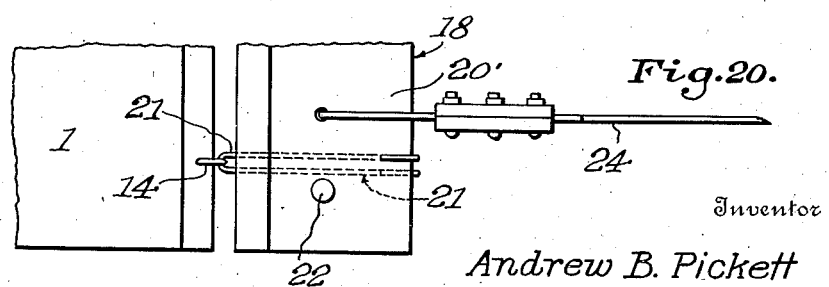

Figures 5 to 8, inclusive, are enlarged end views of several interconnected blocks of the mat connected to fragmentary portions of other blocks and illustrating different shaped transverse edge thereof facing adjoining edges of adjacent blocks which permits flexing of the revetment mat in both directions;

Figure 9 is an enlarged longitudinal edge view of blocks interconnected to adjoining fragmentary portions of adjacent blocks and illustrating other shapes of the ends of the blocks facing adjoining ends of adjacent block for providing spaces or joints between the ends of the blocks which permit flexing of the revetment mat at the ends of the blocks in both directions;

Figure 10 is an enlarged fragmentary longitudinal edge view of blocks of the revetment mat having notches therein extending half-up from the depth of the blocks from the bottom thereof;

Figure 11 is a fragmentary sectional view on an enlarged scale and illustrating the manner of joining one unit section of blocks with an adjacent unit section;

Figure 12 is a fragmentary plan view thereof;

Figure 13 is a perspective view of one unit section of blocks of the revetment mat;

Figure 14 is a perspective view of one unit section of blocks rolled up;

Figure 15 is a perspective view of a plurality of unit sections of the mat connected together and rolled up on a launching drum;

Figure 16 is a perspective view of a unit section of blocks, with the blocks being in alignment;

Figure 17 is a fragmentary perspective view of a modified form of the revetment mat;

Figure 18 is a fragmentary plan view of one end of the revetment mat having a metal header strip and cables connected thereto for anchoring the revetment mat to a river bank or shore;

Figure 19 is an enlarged view of the metal header strip fastened to an end of a revetment block; and Figure 20 is a fragmentary plan view thereof.

Referring more specifically to the drawings, each mattress consists of a plurality of flexible unit sections A constructed of a plurality of oblong shaped blocks 1 made of any suitable material such as reinforced concrete. The blocks 1 are closely spaced apart and cast over crossed longitudinal and transverse binding wires 2 and 3, respectively, extending continuously throughout a unit section of blocks. As seen in Fig. 2, the blocks 1 in alternate rows are in the main offset from the blocks in the intervening rows in break-joint fashion, but the ends of the blocks may be in alignment if desired, as illustrated in Fig. 16.

The transverse longitudinal edges 3' of the blocks 1 are shaped to provide considerable bending or flexure in one direction in rolling the mat on itself, Fig. 14, with the edges 4 at the ends of the blocks providing flexibility in the other direction, whereby the mat is enabled to conform to the irregularities of the underwater area to be protected when the mat is deposited thereon.

The transverse edges 3' of the blocks 1 facing adjoining edges 3' of adjacent blocks and the edges 4 at the ends of blocks may be made in a plurality of different shapes depending upon the degree of flexure desired, yet retaining the desirable feature of minimum openings between the blocks at one plane. The longitudinal transverse edges 3' between the blocks may be beveled to provide beveled openings 3'', with the maximum space between the openings being on one side of the blocks and the minimum space of the openings being on the other side of the blocks as illustrated in Fig. 5. The maximum space between the bevel openings 3'' of the blocks will be on the side on which the mat will be rolled up whereby a mat will be produced which when unrolled down the slope of a river bank to its final position will have no appreciable openings through the mat in which scour can occur.

The blocks in Fig. 6 are shown as having transverse edges 5 which extend straight downwardly to one-half the thickness of the blocks and then are beveled outwardly at 6. The blocks may also be provided with straight transversely extending edges 7 as in Fig. 7 or have transverse beveled edges 8 as in Fig. 8 providing beveled openings 9 between the blocks, with the minimum space of the beveled openings 9 being on the top side of the blocks and the maximum space between the openings being on the bottom side thereof. The ends 10 of the blocks may also have beveled edges 11 as in Fig. 9 providing beveled openings 11' between the ends of the blocks similar to the openings 3'' formed by the transverse beveled edges 3' of the blocks as shown in Fig. 5.

The revetment mat could be cast to form only single transversely extending blocks 1' with the blocks having beveled notches 12 on the bottom surface thereof and no openings extending between the blocks as shown in Fig. 10. This type of block would crack at the notches 12 when stresses were applied to the blocks after the mat was unrolled over the surface to be protected. The beveled notches 12 extend one-half of the thickness of the blocks and could also extend one-half the thickness of the blocks from the top thereof.

The blocks on the ends of the unit sections of the mat have wires 13 provided thereon, with exposed loops 14 formed on the ends of the wires. The loops 14 are provided on the wires 13 for connecting the unit sections of the revetment mat together by means of pieces of wire strands 15 (cables or wire rods) that are threaded through the loops 14.

Before connecting the unit sections A of the revetment mat together, each unit section of blocks is either rolled up on a core 16, shown in dotted lines in Fig. 14, or without a core and then taken to the place of use where it is unrolled. Heavy block anchor weights 17 made of any suitable material, such as concrete, are connected to one end of a metal header strip 18 by cables 18' with the header strip being connected to the blocks in a manner to be hereinafter described. The unit sections of blocks with the anchor weights may be rolled up on a core or drum 19 having a recess 20 formed therein as illustrated in Fig. 15, with the anchor weights 17 mounted in the recess 20; and upon rolling the unit section over the anchor weights 17 prevents them from falling out.

After enough unit sections of blocks are joined together and rolled upon the drum 19 to form a completed mattress of the desired length, a metal header 18 is attached to the shore end of the last unit section of the blocks.

The metal headers 18 illustrated in enlarged detail in Figs. 19 and 20 comprise dual upper and lower plates 20 and 20', respectively, made preferably of steel having wires 21 clamped therebetween by means of bolts 22 and nuts 23. The wires 21 are bent at one end around the front end of the upper plate 20, thence extend between the plates 20 and 20' to the rear end of the header. The wires 21 then pass through the loops 14 on the ends of the wires 13 cast in the ends of the unit mat sections. From the wire loops 14 the wires 21 extend back between the plates and are then bent around the outer end of the lower plate 20' of the header. Anchor cables 24 are fastened at one of their ends to the header at the shore end of the revetment mat.

Before the revetment mat is unrolled down the slope of a river bank or the like, the cables 24 are fastened at their other ends to anchors 25 on shore, said anchors being of any suitable type such as screw anchors, deadmen or the like.

After the revetment mat is fastened to the shore anchors 25 by the cables 24 it is unrolled down the slope of the river bank coming to rest, finally, at its lower end at the bottom of the slope of the river bank as illustrated in Fig. 1, with the heavy concrete block anchor weights 17 at the bottom end of the revetment mat holding the revetment mat securely and firmly stretched over the slope of the river bank and serving as an anchor to hold down the free lower end of the revetment mat thus preventing the river current from turning back the free end of the mat.

The revetment mat may take the form as illustrated in Fig. 17 wherein every fifth block 26 extends transversely completely across the mat, with a plurality of aligned blocks 26' extending between the blocks 26.

Having thus described my invention, what I claim as new and wish to secure by Letters Patent is:

1. A roll-type flexible revetment mat comprising a plurality of slat-like units arranged with their lengths extending transversely of the mat, the said mat thereby being made up of a plurality of rows of the said units, flexible reinforcing means for the said units extending through the units lengthways thereof and flexibly interconnecting the units in end-to-end relation, complemental locking means on each side of each unit adapted, when in locking engagement, to flexibly interlock each row in a direction longitudinally of the mat, the units of each row being of different lengths for staggering the units of one row relative to the units of adjacent rows in a direction longitudinally of the mat, locking means on an end row of the units being adapted to receive securing means for securing an end of the mat to a station of use, the said end row being the secured end of the mat when in service, anchoring means on an opposite end row of units defining a free end of the mat when in service, and means flexibly securing the anchoring means to the free end row of units and enabling unobstructing housing of the anchoring means during placement of the mat, the units composing the said mat being so arranged and interconnected in a manner such that the mat may be coiled up into a tight roll, taken to a place of use and unrolled down a shore to be protected, the anchoring means being released from their housing responsively to termination of the unrolling movement of the mat to anchor the free end of the mat permanently in position, the mat when placed in position being self-accommodating to irregularities in contour of the shore.

2. A roll-type flexible revetment mat comprising, in combination, a drum and a revetment mat rolled on the drum, the revetment mat comprising a plurality of slat-like units arranged with their lengths extending transversely of the mat, the said mat thereby being made up of a plurality of rows of the said units, flexible reinforcing means for the said units extending continuously through the units lengthways thereof and flexibly interconnecting the units in end-to-end relation, complemental locking means on each longitudinal side of each unit adapted, when in locking engagement, to flexibly interlock each row in a direction longitudinally of the mat, the units of each row being of different lengths for staggering the units of one row relative to units of adjacent rows in a direction longitudinally of the mat, locking means on an end row of the units adapted to receive securing means for securing an end of the mat to a station of use, the said end row of units being the head or secured end of the mat when in service, anchoring means on an opposite end row of the units which defines a free end of the mat when in service, the said drum being provided with end recesses, and means flexibly securing the anchoring means to the free end row of units enabling the anchoring means to be housed in the recesses in the ends of the drum, the mat being wrapped on the drum in a roll in such manner that the mat and drum may be taken to a place of use, the head end secured to a shore to be protected and the mat unrolled down the shore to release the drum and the anchoring means therefrom responsively to termination of the unrolling movement of the mat to anchor permanently the free end of the mat in position.

3. A roll-type flexible revetment mat composed of a plurality of flexibly interconnected sections, each section comprising a plurality of slat-like units arranged with their lengths extending transversely of the mat, the said mat thereby being made up of a plurality of rows of the said units, flexible reinforcing means for the said units extending continuously through the units lengthways thereof, and flexibly interconnecting the units in end-to-end relation, complemental locking means on each side of each unit adapted, when in locking engagement, to flexibly interlock each unit of each row in a direction longitudinally of the mat, the units of each row being of different lengths for staggering the units of one row relative to the units of adjacent rows in a direction longitudinal of the mat, the said units being beveled on their longitudinal sides, locking means on an end row of the units adapted to receive securing means for securing the end row of the mat to a station of use, the said end row being the head or secured end of the mat when in service, the locking means on the opposite end of each section being adapted to be connected with the locking means of the adjacent end of the successive section, a hinge bar passing through the locking means of adjacent sections for forming a hinge connection between the sections, the mat terminating in an end section forming a free end of the mat, the said mat being extensible by interposition of other sections in its length and terminating in an end section defining a free end for the mat, a header bar extending across the free end of the mat and flexibly secured thereto, anchoring means on the header bar, and flexible connecting means connecting the anchoring means to the header bar and enabling unobstructing housing of the anchoring means during placement of the mat, the units and sections of the mat being so arranged and interconnected in a manner such that the mat may be coiled up into a tight roll, the resulting roll taken to a place of use, the secured end of the roll secured in place and the roll unrolled down a shore to be protected, the anchoring means being released automatically from their housing responsively to termination of the unrolling of the mat.

ANDREW B. PICKETT.

REFERENCES CITED

The following references are of record in the file of this patent:

UNITED STATES PATENTS

| Number | Name | Date |
|---|---|---|
| 167,180 | Lombard | Aug. 31, 1875 |
| 173,419 | Potter | Feb. 15, 1876 |
| 1,071,091 | Rogers | Aug. 26, 1913 |
| 1,768,309 | Dark | June 24, 1930 |
| 1,847,852 | Upson | Mar. 1, 1932 |
| 2,390,403 | Van Der Rest | Dec. 4, 1945 |